United States Patent
Xiao

(10) Patent No.: US 11,330,650 B2
(45) Date of Patent: May 10, 2022

(54) WIRELESS CONNECTION METHOD AND DEVICE

(71) Applicant: HISENSE VISUAL TECHNOLOGY CO., LTD., Qingdao (CN)

(72) Inventor: Weiting Xiao, Qingdao (CN)

(73) Assignee: HISENSE VISUAL TECHNOLOGY CO., LTD., Qingdao (CN)

( * ) Notice: Subject to any disclaimer, the term of this patent is extended or adjusted under 35 U.S.C. 154(b) by 110 days.

(21) Appl. No.: 16/851,186

(22) Filed: Apr. 17, 2020

(65) Prior Publication Data

US 2020/0245386 A1 Jul. 30, 2020

Related U.S. Application Data

(63) Continuation of application No. PCT/CN2018/077410, filed on Feb. 27, 2018.

(30) Foreign Application Priority Data

Oct. 31, 2017 (CN) .......................... 201711048126.6

(51) Int. Cl.
*H04W 4/00* (2018.01)
*H04W 76/14* (2018.01)
(Continued)

(52) U.S. Cl.
CPC ............. *H04W 76/14* (2018.02); *H04W 4/12* (2013.01); *H04W 4/80* (2018.02); *H04W 80/02* (2013.01)

(58) Field of Classification Search
CPC ....... H04W 76/14; H04W 80/02; H04W 4/12; H04W 4/80; H04W 84/12; H04W 76/16; H04W 8/005; H04W 84/18
(Continued)

(56) References Cited

U.S. PATENT DOCUMENTS 9,000,896 B1* 4/2015 Kim ...................... H04L 41/082
340/10.5
9,426,118 B2* 8/2016 Kim .................... H04L 63/0876
(Continued)

FOREIGN PATENT DOCUMENTS

CN 104202461 A 12/2014
CN 104657099 A 5/2015
(Continued)

OTHER PUBLICATIONS

The International Search Report of corresponding International application No. PCT/CN2018/077410, dated May 21, 2018.
The EESR of EP application No. 18874111.0.

*Primary Examiner* — Marceau Milord
(74) *Attorney, Agent, or Firm* — J.C. Patents

(57) ABSTRACT

Provided are a wireless connection method and device, where the method includes: receiving, by a second device, a first Bluetooth advertising message from a first device, where the first Bluetooth advertising message includes a first channel pointer; receiving a second Bluetooth advertising message from the first device on a channel indicated by the first channel pointer, where the second Bluetooth advertising message includes a WIFI direct address of the first device; sending a first Bluetooth message to the first device, where the first Bluetooth message includes a WIFI direct address of the second device; and performing a WIFI direct connection operation according to the WIFI direct address of the first device and the WIFI direct address of the second device. The method and device provided in the embodiments of the present application can shorten the time required for WIFI direct connection and improve the direct connection efficiency.

20 Claims, 7 Drawing Sheets

(51) Int. Cl.
*H04W 4/80* (2018.01)
*H04W 4/12* (2009.01)
*H04W 80/02* (2009.01)

(58) Field of Classification Search
USPC .......................................................... 370/329
See application file for complete search history.

(56) References Cited

U.S. PATENT DOCUMENTS

| | | | |
|---|---|---|---|
| 9,489,787 B1* | 11/2016 | Ives-Halperin | G07C 9/29 |
| 9,531,601 B2* | 12/2016 | Kim | G06F 3/0482 |
| 9,647,888 B2* | 5/2017 | Kim | H04L 12/281 |
| 9,924,513 B2* | 3/2018 | Sidhu | H04W 72/0453 |
| 9,998,437 B2* | 6/2018 | Kim | H04L 12/2818 |
| 10,075,334 B1* | 9/2018 | Kozura | H04W 12/086 |
| 10,212,047 B2* | 2/2019 | Kim | G06F 3/0482 |
| 2009/0137206 A1* | 5/2009 | Sherman | H04W 16/14 |
| | | | 455/41.2 |
| 2009/0180451 A1* | 7/2009 | Alpert | H04W 72/1215 |
| | | | 370/338 |
| 2011/0188391 A1* | 8/2011 | Sella | H04L 67/1051 |
| | | | 370/252 |
| 2012/0079019 A1* | 3/2012 | Miettinen | H04L 67/303 |
| | | | 709/204 |
| 2012/0079086 A1* | 3/2012 | Miettinen | H04L 51/00 |
| | | | 709/222 |
| 2013/0201316 A1* | 8/2013 | Binder | H04L 67/12 |
| | | | 348/77 |
| 2014/0185469 A1* | 7/2014 | Marmolejo-Meillon | |
| | | | H04W 36/14 |
| | | | 370/252 |
| 2014/0378058 A1 | 12/2014 | Decuir | |
| 2015/0264627 A1* | 9/2015 | Perdomo | H04L 67/18 |
| | | | 370/329 |
| 2015/0350820 A1* | 12/2015 | Son | H04L 63/107 |
| | | | 455/41.2 |
| 2016/0006837 A1* | 1/2016 | Reynolds | H04L 41/0853 |
| | | | 709/203 |
| 2016/0014824 A1 | 1/2016 | Xiang | |
| 2016/0050589 A1* | 2/2016 | Safavi | H04W 36/165 |
| | | | 455/436 |
| 2016/0087933 A1* | 3/2016 | Johnson | H04L 67/34 |
| | | | 709/245 |
| 2017/0215113 A1* | 7/2017 | Lee | H04W 8/005 |
| 2017/0223485 A1 | 8/2017 | Abraham et al. | |
| 2017/0223579 A1 | 8/2017 | Lee | |
| 2019/0289648 A1* | 9/2019 | Kim | H04W 48/08 |
| 2019/0327774 A1* | 10/2019 | Ma | H04W 76/14 |
| 2020/0204613 A1* | 6/2020 | Hatambeiki | G05B 15/02 |
| 2020/0220746 A1* | 7/2020 | Shribman | G06F 9/45545 |

FOREIGN PATENT DOCUMENTS

CN 105144757 A 12/2015
JP 107079256 A 8/2017

* cited by examiner

WIRELESS CONNECTION METHOD AND DEVICE

CROSS-REFERENCE TO RELATED APPLICATION

This application is a continuation of International Application No. PCT/CN2018/077410, filed on Feb. 27, 2018, which claims priority to Chinese Patent Application No. 201711048126.6, filed on Oct. 31, 2017, and entitled "WIRELESS CONNECTION METHOD AND DEVICE", which are hereby incorporated by reference in their entireties.

TECHNICAL FIELD

Embodiments of the present application relate to the technical field of Miracast, and in particular, to a wireless connection method and device.

BACKGROUND

Miracast is an underlying technology based on Wireless-Fidelity (WIFI), which is a wireless interconnection technology to realize peer-to-peer device interconnection through a WIFI direct connection protocol. In the related art, a Miracast direct connection process between devices can mainly be divided into three stages: device discovery, service discovery, and group formation. After these three stages, the WIFI wireless connection can be established as a backbone to be provided to upper-layer audio and video applications for use.

SUMMARY

Embodiments of the present application provide a wireless connection method and device, which allows for shortening a time required for WIFI direct connection and improve the direct connection efficiency.

A first aspect of the embodiments of the present application provides a wireless connection method, including: receiving, by a second device, a first Bluetooth advertising message from a first device, where the first Bluetooth advertising message includes a first channel pointer; receiving, by the second device, a second Bluetooth advertising message from the first device on a channel indicated by the first channel pointer, where the second Bluetooth advertising message includes a WIFI direct address of the first device; sending, by the second device, a first Bluetooth message to the first device, where the first Bluetooth message includes a WIFI direct address of the second device; and performing, by the second device, a WIFI direct connection operation according to the WIFI direct address of the first device and the WIFI direct address of the second device.

In an alternative embodiment, the second Bluetooth advertising message further includes service configuration information of the first device.

In an alternative embodiment, after the receiving, by the second device, a second Bluetooth advertising message from the first device on a channel indicated by the first channel pointer, the method further includes: determining whether to establish a WIFI direct connection with the first device based on the service configuration information of the first device; and in response to that it is determined to establish the WIFI direct connection with the first device, sending the first Bluetooth message to the first device.

In an alternative embodiment, the performing, by the second device, a WIFI direct connection operation according to the WIFI direct address of the first device and the WIFI direct address of the second device, includes: sending, by the second device, a second Bluetooth message to the first device, where the second Bluetooth message includes a Bluetooth Medium Access Control (MAC) address of the second device; receiving, by the second device, a third Bluetooth advertising message from the first device on a port where the Bluetooth MAC address indicates, where the third Bluetooth advertising message includes a start time and a second channel pointer; and establishing, by the second device, a WIFI direct connection with the first device based on a channel indicated by the second channel pointer when the start time arrives.

In an alternative embodiment, after the receiving, by the second device, a third Bluetooth advertising message from the first device, the method further includes: turning off, by the second device, a Bluetooth device of the second device.

A second aspect of the embodiments of the present application provides a wireless connection method, including: sending, by a first device, a first Bluetooth advertising message, where the first Bluetooth advertising message includes a first channel pointer; sending, by the first device, a second Bluetooth advertising message on a channel indicated by the first channel pointer, where the second Bluetooth advertising message includes a WIFI direct address of the first device; receiving, by the first device, a first Bluetooth message sent from a second device, where the first Bluetooth message includes a WIFI direct address of the second device; and performing, by the first device, a WIFI direct connection operation according to the WIFI direct address of the second device and the WIFI direct address of the first device.

In an alternative embodiment, the second Bluetooth advertising message further includes service configuration information of the first device.

In an alternative embodiment, before the performing, by the first device, a WIFI direct connection operation according to the WIFI direct address of the second device and the WIFI direct address of the first device, the method includes: receiving, by the first device, a second Bluetooth message sent from the second device, where the second Bluetooth message includes a Bluetooth MAC address of the second device; and sending, by the first device, a third Bluetooth advertising message to the second device based on the Bluetooth MAC address, where the third Bluetooth advertising message includes a start time and a second channel pointer to enable the second device to establish a WIFI direct connection with the first device based on a channel indicated by the second channel pointer when the start time arrives.

In an alternative embodiment, after the sending, by the first device, a third Bluetooth advertising message to the second device based on the Bluetooth MAC address, the method further includes: turning off, by the first device, a Bluetooth device of the first device.

A third aspect of the embodiments of the present application provides a terminal device, including: a first receiving module, configured to receive a first Bluetooth advertising message from a first device, where the first Bluetooth advertising message includes a first channel pointer; a second receiving module, configured to receive a second Bluetooth advertising message from the first device on a channel indicated by the first channel pointer, where the second Bluetooth advertising message includes a WIFI direct address of the first device; a first sending module, configured to send a first Bluetooth message to the first device, where the first Bluetooth message includes a WIFI direct address of the terminal device; and a direct connection module, configured to perform a WIFI direct connection operation according to the WIFI direct address of the first device and the WIFI direct address of the terminal device.

In an alternative embodiment, the second Bluetooth advertising message further includes service configuration information of the first device.

In an alternative embodiment, the terminal device further includes: a determining module, configured to determine whether to establish a WIFI direct connection between the terminal device and the first device based on the service configuration information of the first device after the second Bluetooth advertising message is received; the first sending module is configured to send the first Bluetooth message to the first device when the determining module determines to establish the WIFI direct connection between the terminal device and the first device.

In an alternative embodiment, the direct connection module includes: a sending sub-module, configured to send a second Bluetooth message to the first device, where the second Bluetooth message includes a Bluetooth MAC address of the terminal device; a receiving sub-module, configured to receive a third Bluetooth advertising message from the first device on a port where the Bluetooth MAC address indicates, where the third Bluetooth advertising message includes a start time and a second channel pointer; and a direct connection establishing sub-module, configured to establish a WIFI direct connection between the first device and the terminal device based on a channel indicated by the second channel pointer when the start time arrives.

In an alternative embodiment, the terminal device further includes: a switch module, configured to turn off a Bluetooth device of the terminal device.

A fourth aspect of the embodiments of the present application provides a terminal device, including: a first sending module, configured to send a first Bluetooth advertising message, where the first Bluetooth advertising message includes a first channel pointer; a second sending module, configured to send a second Bluetooth advertising message on a channel indicated by the first channel pointer, where the second Bluetooth advertising message includes a WIFI direct address of the terminal device; a first receiving module, configured to receive a first Bluetooth message sent from a second device, where the first Bluetooth message includes a WIFI direct address of the second device; and a direct connection module, configured to perform a WIFI direct connection operation according to the WIFI direct address of the terminal device and the WIFI direct address of the second device.

In an alternative embodiment, the second Bluetooth advertising message further includes service configuration information of the first device.

In an alternative embodiment, the terminal device further includes: a second receiving module, configured to receive a second Bluetooth message sent from the second device, where the second Bluetooth message includes a Bluetooth MAC address of the second device; and a third sending module, configured to send a third Bluetooth advertising message to the second device based on the Bluetooth MAC address, where the third Bluetooth advertising message includes a start time and a second channel pointer to enable the second device to establish a WIFI direct connection with the terminal device based on a channel indicated by the second channel pointer when the start time arrives.

In an alternative embodiment, the terminal device further includes: a switch module, configured to turn off a Bluetooth device of the terminal device.

A fifth aspect of the embodiments of the present application provides a terminal device, including: a memory and a processor, where the memory stores computer instructions, which when performed by the processor, implement the method described in the first aspect.

A sixth aspect of the embodiments of the present application provides a terminal device, including: a memory and a processor, where the memory stores computer instructions, which when performed by the processor, implement the method described in the second aspect.

BRIEF DESCRIPTION OF DRAWINGS

In order to explain the embodiments of the present application or related art more clearly, the drawings used in description of the embodiments or related art are briefly introduced below. Obviously, the drawings in the following description are only some embodiments of the application, and those of skilled in the art can obtain other drawings according to these drawings without paying creative labor.

DESCRIPTION OF EMBODIMENTS

In the following, the embodiments of the present application will be clearly and completely described with reference to the drawings in the embodiments of the present application. Obviously, the described embodiments are only a part of the embodiments of the present application, not all of the embodiments. Based on the embodiments in the present application, all other embodiments obtained by those of skilled in the art without paying creative efforts shall fall within the protection scope of the present application.

The terms "including" and "having" and any variants thereof in the description and claims of the present application are intended to cover non-exclusive inclusions. For example, a process that includes a series of steps or structural apparatus need not be construed to limit to those structures or steps that are explicitly listed but may include other steps or structures that are not explicitly listed or inherent to those processes or apparatuses.

In the related WIFI direct connection protocol, during the two stages of device discovery and service discovery, device of both parties must perform random switching in time (100 ms to 300 ms) and frequency (channel 1, channel 6 and channel 11) in the monitoring and search state. The purpose of random switching is to prevent one device from being unable to switch to a correct frequency to search and find the other device while the other device is listening. However, the random switching method will cause the device discovery and service discovery phases to take too long under a certain probability, resulting in a waste of time, and even a direct connection failure caused by a direct connection timeout.

Figure 1:
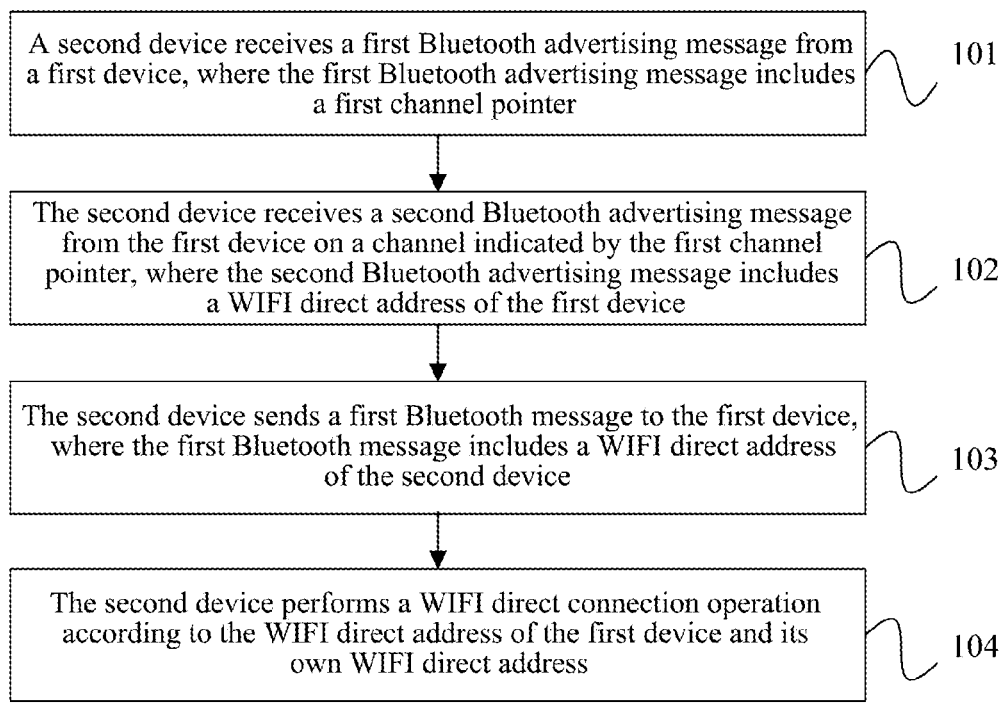
FIG. 1 is a flowchart of a wireless connection method according to an embodiment of the present application.

An embodiment of the present application provides a wireless connection method. Since the embodiment of the present application implements device discovery and service discovery during the WIFI direct connection process through a Bluetooth advertising message, there is no need for the first device and the second device to search for and listen to each other by random switching in time and channel. Therefore, a time required for WIFI direct connection is shortened, the direct connection efficiency is improved, and a probability of direct connection failure caused by the direct connection timeout is reduced. As shown in FIG. 1, which is a flowchart of a wireless connection method according to an embodiment of the present application, the method includes the following steps.

Step 101, a second device receives a first Bluetooth advertising message from a first device, where the first Bluetooth advertising message includes a first channel pointer.

The first device and the second device involved in the embodiment may be a terminal device that has a built-in low-power Bluetooth component and has a WIFI direct connection function, such as a television, a mobile phone, a notebook computer, a digital camera, and the like.

Figure 2:
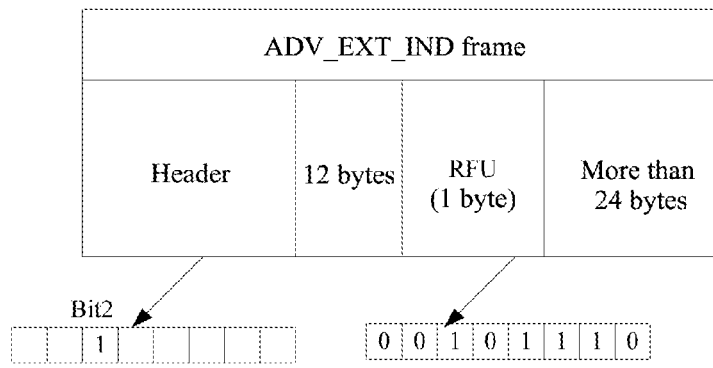
FIG. 2 is a schematic structural diagram of an ADV_EXT_IND frame according to an embodiment of the present application.

After a Bluetooth function is started and a waiting connection page is entered, the second device receives the first Bluetooth advertising message through the low-power Bluetooth component. The first advertising message at least carries the first channel pointer for indicating on which channel the first device receives a second Bluetooth advertising message. In an alternative embodiment, it may also carry a first flag bit, which is used to indicate whether the first device is a device used for WIFI direct connection. For example, the first Bluetooth advertising message in the embodiment may be in the form of an ADV_EXT_IND frame. In the ADV_EXT_IND frame shown in FIG. 2, when a value of a second Bit (a RFU field in a Bluetooth specification) in the header is set to a preset value ("1" in the example, it can also be set to other values according to actual applications), the first device is a device used for Miracast direct connection, and a $13^{th}$ byte (which is also a RFU field) is set to a specific unique value (such as 00101110 in FIG. 2, but not limited to this value, it can be set as needed) to identify that it is the ADV_EXT_IND frame sent from the first device, where the first channel pointer can be set in a field, such as "more than 24 bytes" or "12 bytes" in FIG. 2. Of course, this is only an illustration but not the only limitation to the present application.

Step 102, the second device receives a second Bluetooth advertising message from the first device on a channel indicated by the first channel pointer, where the second Bluetooth advertising message includes a WIFI direct address of the first device.

Several ways to send the second advertising message in the embodiments are as follows.

In an alternative embodiment, the first device sends the second Bluetooth advertising message at a preset time interval after sending the first Bluetooth advertising message to ensure that the second device has sufficient time to parse the first channel pointer from the first Bluetooth advertising message, and to make preparations for receiving the second Bluetooth advertising message on the channel indicated by the first channel pointer, so as to improve a success rate of transmitting the second Bluetooth advertising message.

In another embodiment, the first device continuously sends the second Bluetooth advertising message repeatedly after sending the first Bluetooth advertising message, and stops sending after a preset time, thereby ensuring that the second device can successfully receive the second Bluetooth advertising message.

In a further embodiment, the first device sends the first Bluetooth advertising message and the second Bluetooth advertising message alternately to ensure that the second device can successfully receive the first Bluetooth advertising message and the second Bluetooth advertising message.

Figure 3:
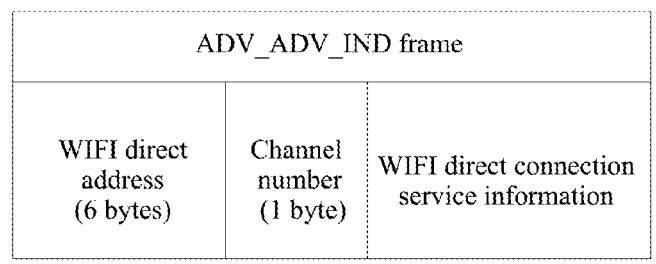
FIG. 3 is a schematic structural diagram of an ADV_ADV_IND frame according to an embodiment of the present application.

In the embodiment, the second Bluetooth advertising message needs to include the WIFI direct address of the first device. In an alternative embodiment, the second Bluetooth advertising message may further include a channel number and other service configuration information (such as an audio format or a video format, or the like). The channel number is a channel number that is supposed to be used by the first device during the group formation stage. Exemplarily, the second Bluetooth advertising message in the embodiment may be in the form of an ADV_ADV_IND frame. In the ADV_ADV_IND frame shown in FIG. 3, the first six bytes are the WIFI direct address of the first device, and the next byte is the channel number (such as channel 11) that is supposed to be used by the first device during the group formation stage. The other bytes can be loaded with WIFI direct connection service information to describe service configurations (such as audio format) of the first device. Of course, this is only an illustration but not the only limitation to the present application.

In an alternative embodiment, in order to avoid a compatibility problem, after receiving the second Bluetooth advertising message, the second device in the embodiment can further determine whether data transmitted between the second device and the first device is compatible, based on the service configuration information carried in the second Bluetooth advertising message, in response to the data being compatible, it is determined that the second device establishes a WIFI direct connection with the first device, and the process goes to step 103. Otherwise, it refuses to establish the direct connection with the first device.

Step 103, the second device sends a first Bluetooth message to the first device, where the first Bluetooth message includes a WIFI direct address of the second device.

Figure 4:
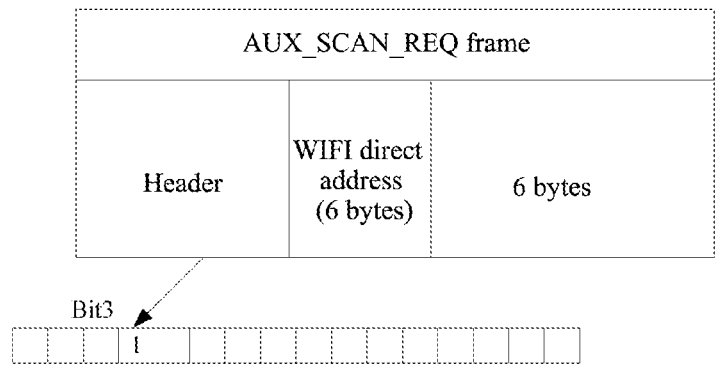
FIG. 4 is a schematic structural diagram of an AUX_SCAN_REQ frame according to an embodiment of the present application.

Exemplarily, the first Bluetooth message in the embodiment may be in the form of an AUX_SCAN_REQ frame. As shown in the AUX_SCAN_REQ frame shown in FIG. 4, when a value of a third bit (a RFU field in the Bluetooth specification) of the header in the AUX_SCAN_REQ frame is a preset value ("1" in the example, it can also be set to other values according to actual applications), it means that the frame carries the WIFI direct address of the second device. At this time, the first six bytes of data (after the header) are the WIFI direct address of the second device. Of course, this is only an illustration but not the only limitation to the present application.

After the first device receives the first Bluetooth message, the WIFI direct address of the second device carried in the first Bluetooth message is identified according to the third byte in the header. After parsing the WIFI direct address of the second device from the first Bluetooth message, the first device stores the WIFI direct address for use in the subsequent group forming process.

Step 104, the second device performs a WIFI direct connection operation according to the WIFI direct address of the first device and the WIFI direct address of the second device.

In the embodiment, after the second device sends the first Bluetooth message to the first device, the second device may establish a WIFI direct connection with the first device according to a preset channel, or may determine a channel for establishing the WIFI direct connection through negotiation.

Figure 5:
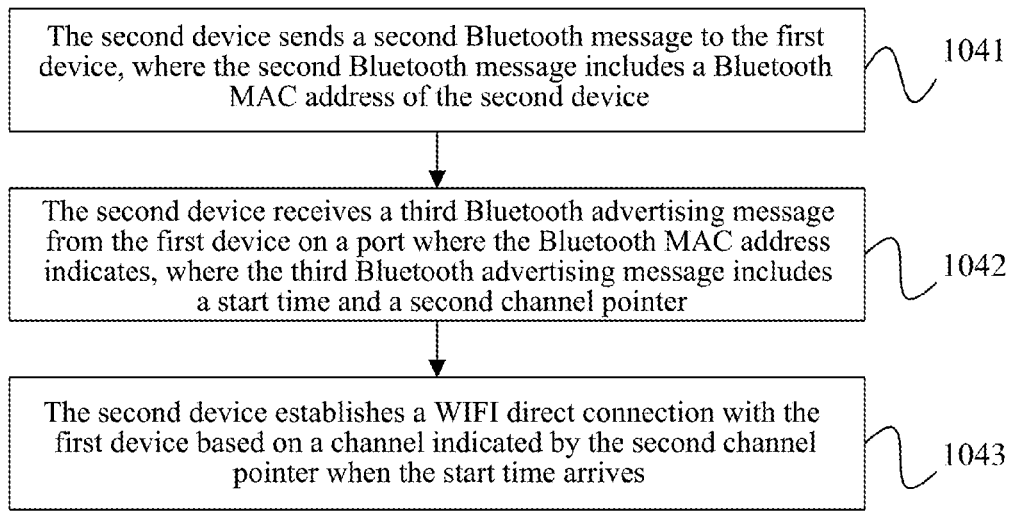
FIG. 5 is a flowchart of step 104 according to an embodiment of the present application.

Exemplarily, FIG. 5 is a flowchart of step 104 according to the embodiment of the present application. As shown in FIG. 5, step 104 may include the following steps.

Step 1041, the second device sends a second Bluetooth message to the first device, where the second Bluetooth message includes a Bluetooth MAC address of the second device.

Figure 6:
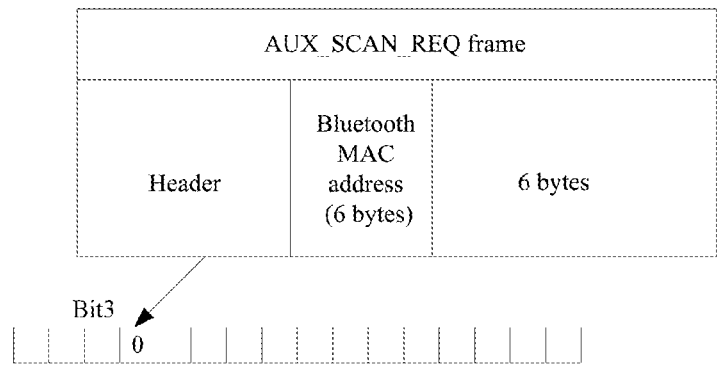
FIG. 6 is a schematic structural diagram of an AUX_SCAN_REQ frame according to an embodiment of the present application.

Exemplarily, the second Bluetooth message in the embodiment may be implemented in the form of an AUX_SCAN_REQ frame. As shown in the AUX_SCAN_REQ frame shown in FIG. 6, when a value of a third bit (a RFU field) of the header in the AUX_SCAN_REQ frame is a preset value ("0" in the example, it can also be set to other values according to actual applications), it means that the frame carries the Bluetooth MAC address of the second device. At this time, the first six bytes of data (after the header) are the Bluetooth MAC address of the second device. Of course, this is only an illustration but not the only limitation of the present application.

After receiving the second Bluetooth message, the Bluetooth MAC address of the second device carried in the second Bluetooth message is identified according to the third byte in the header. After parsing the Bluetooth MAC address of the second device from the second Bluetooth message, the first device stores the Bluetooth MAC address to construct a third Bluetooth advertising message to be sent subsequently.

Figure 7:
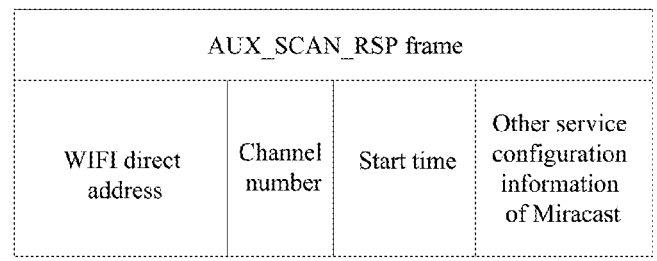
FIG. 7 is a schematic structural diagram of an AUX_SCAN_RSP frame according to an embodiment of the present application.

Exemplarily, the third Bluetooth message in the embodiment may be implemented as an AUX_SCAN_RSP frame. As shown in FIG. 7, the AUX_SCAN_RSP frame in FIG. 7 necessarily includes a second channel pointer and a start time. In an alternative embodiment, the AUX_SCAN_RSP frame may further include the WIFI direct address of the first device and other service configuration information of the first device. The start time is used to indicate when the second device starts the group forming process. The second channel pointer is used to indicate a channel to be used during the group formation.

After the sending of the third Bluetooth message is completed, the first device turns off its Bluetooth device, enters the WIFI connection state, waiting for the group forming process.

Of course, the above example is only an illustration but not the only limitation to the present application.

Step 1042, the second device receives a third Bluetooth advertising message from the first device on a port where the Bluetooth MAC address indicates, where the third Bluetooth advertising message includes a start time and a second channel pointer.

In the embodiment, the second device turns off its Bluetooth device after receiving the third Bluetooth advertising message. At this time, the second device can display related information (such as the name and WIFI address) of the first device to the user. The Miracast direct connection between the first device and the second device is performed when the user selects the first device to perform the Miracast direct connection. Of course, in actual applications, the step of displaying the related information of the first device to the user may also be omitted, and the second device directly establishes the Miracast direct connection between the first device and the second device. It is not specifically limited in the embodiment.

Step 1043, the second device establishes a WIFI direct connection with the first device based on a channel indicated by the second channel pointer when the start time arrives.

In the embodiment, the second device receives the first Bluetooth advertising message including the first channel pointer sent from the first device, receives the second Bluetooth advertising message including the WIFI direct address of the first device sent from the first device on the channel indicated by the first channel pointer, sends the first Bluetooth message including the WIFI direct address of the second device to the first device, and performs the WIFI direct connection operation according to the WIFI direct connection address of the first device and its own WIFI direct connection address. Since the embodiment implements device discovery and service discovery during the WIFI direct connection process through the Bluetooth advertising messages, there is no need for the first device and the second device to search for and listen to each other by random switching in time and channel. Therefore, a time required for WIFI direct connection is shortened, the direct connection efficiency is improved, and a probability of direct connection failure due to direct connection timeout is reduced.

Figure 8:
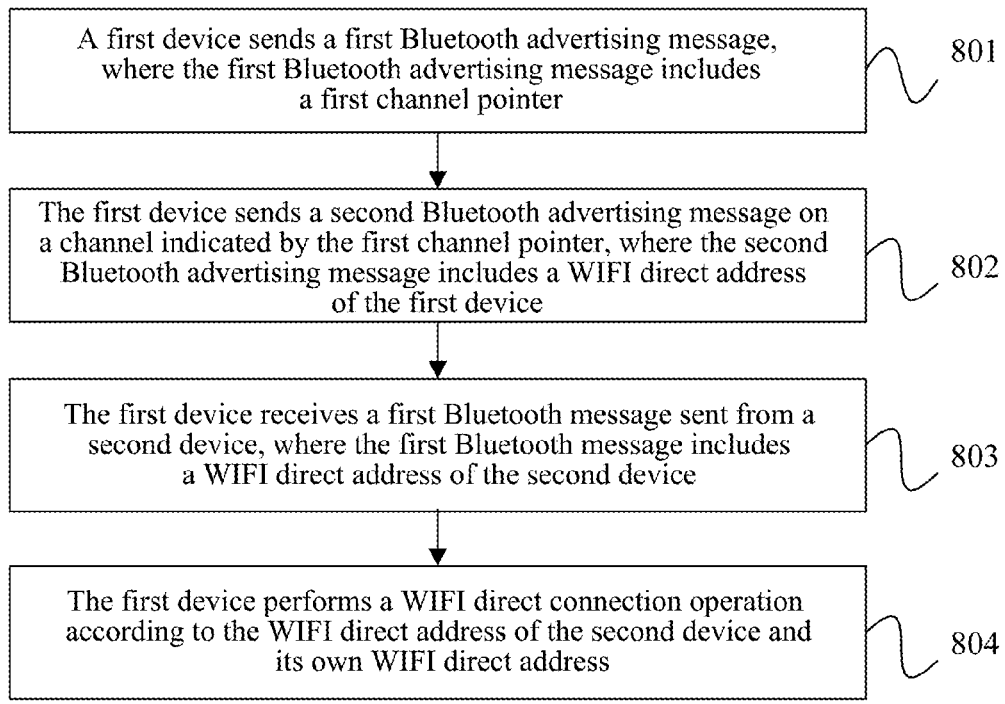
FIG. 8 is a flowchart of a wireless connection method according to an embodiment of the present application.

FIG. 8 is a flowchart of a wireless connection method according to an embodiment of the present application. As shown in FIG. 8, the method is as follows.

Step 801, a first device sends a first Bluetooth advertising message, where the first Bluetooth advertising message includes a first channel pointer.

In the embodiment, the first Bluetooth advertising message further includes service configuration information of the first device.

Step 802, the first device sends a second Bluetooth advertising message on a channel indicated by the first channel pointer, where the second Bluetooth advertising message includes a WIFI direct address of the first device.

Step 803, the first device receives a first Bluetooth message sent from a second device, where the first Bluetooth message includes a WIFI direct address of the second device.

Step 804, the first device performs a WIFI direct connection operation according to the WIFI direct address of the second device and the WIFI direct address of the first device.

In an alternative embodiment, before the first device performs the WIFI direct connection operation according to the WIFI direct address of the second device and the WIFI direct address of the first device, the method includes: the first device receives a second Bluetooth message sent from the second device, where the second Bluetooth message includes a Bluetooth MAC address of the second device; and the first device sends a third Bluetooth advertising message to the second device based on the Bluetooth MAC address, where the third Bluetooth advertising message includes a start time and a second channel pointer to enable the second device to establish a WIFI direct connection with the first device based on a channel indicated by the second channel pointer when the start time arrives.

After the first device sends the third Bluetooth advertising message to the second device based on the Bluetooth MAC address, the method further includes: the first device turns off its Bluetooth device.

The implementation method and beneficial effects of the method according to the embodiment are similar to those of the embodiment in FIG. 1, which are not described herein again.

Figure 9:
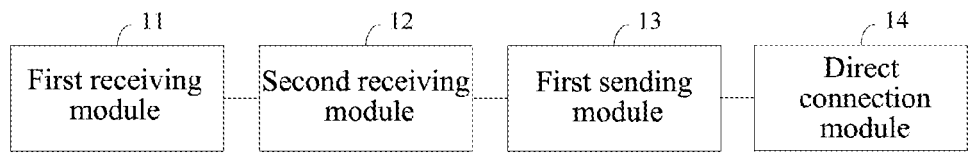
FIG. 9 is a schematic structural diagram of a terminal device according to an embodiment of the present application.

FIG. 9 is a schematic structural diagram of a terminal device according to an embodiment of the present application. As shown in FIG. 9, the device is as follows.

A first receiving module 11, is configured to receive a first Bluetooth advertising message from a first device, where the first Bluetooth advertising message includes a first channel pointer.

A second receiving module 12, is configured to receive a second Bluetooth advertising message from the first device on a channel indicated by the first channel pointer, where the second Bluetooth advertising message includes a WIFI direct address of the first device.

A first sending module 13, is configured to send a first Bluetooth message to the first device, where the first Bluetooth message includes a WIFI direct address of the terminal device.

A direct connection module 14, is configured to perform a WIFI direct connection operation according to the WIFI direct address of the first device and the WIFI direct address of the terminal device.

In an alternative embodiment, the second Bluetooth advertising message further includes service configuration information of the first device.

The terminal device further includes:

a determining module, is configured to determine whether data transmitted between the terminal device and the first device is compatible based on the service configuration information of the first device after the second Bluetooth advertising message is received, and in response to the data being compatible, determines to establish a WIFI direct connection between the terminal device and the first device.

The first sending module 13 is configured to send the first Bluetooth message to the first device when the determining module determines to establish the WIFI direct connection between the terminal device and the first device.

The terminal device according to the embodiment can perform the scheme in the embodiment in FIG. 1, in which the specific implementation method and beneficial effects are similar, which are not described herein again.

Figure 10:
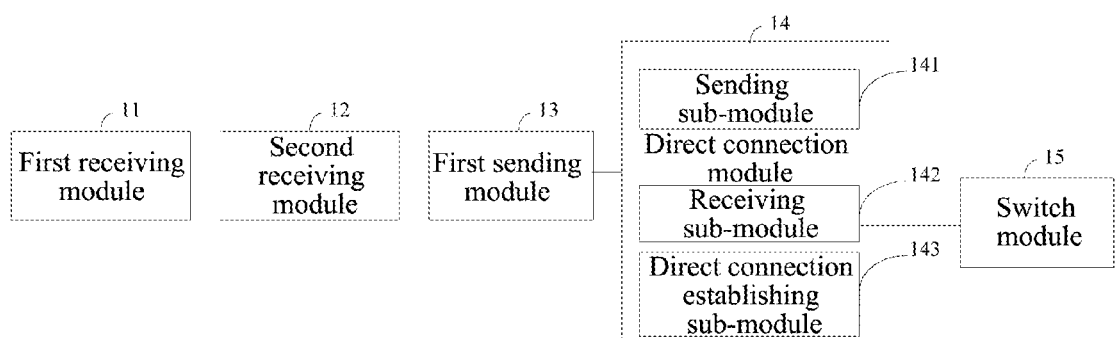
FIG. 10 is a schematic structural diagram of a terminal device according to an embodiment of the present application.

FIG. 10 is a schematic structural diagram of a terminal device according to an embodiment of the present application. As shown in FIG. 10, based on the embodiment in FIG. 9, the direct connection module 14 includes the following modules.

A sending sub-module 141, is configured to send a second Bluetooth message to the first device, where the second Bluetooth message includes a Bluetooth MAC address of the terminal device.

A receiving sub-module 142, is configured to receive a third Bluetooth advertising message from the first device on a port where the Bluetooth MAC address indicates, where the third Bluetooth advertising message includes a start time and a second channel pointer.

A direct connection establishing sub-module 143, is configured to establish a WIFI direct connection between the first device and the terminal device based on a channel indicated by the second channel pointer when the start time arrives.

The terminal device further includes:

a switch module 15, configured to turn off a Bluetooth device of the terminal device.

The terminal device according to the embodiment can perform the scheme in the embodiment in FIG. 5, in which the specific implementation method and beneficial effects are similar, which are not described herein again.

Figure 11:
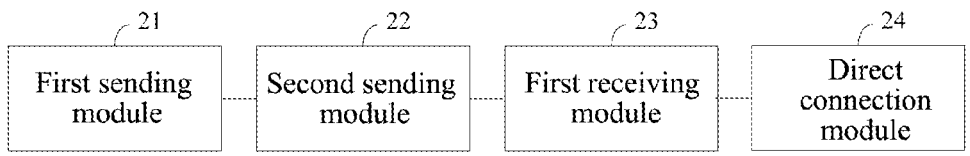
FIG. 11 is a schematic structural diagram of a terminal device according to an embodiment of the present application.

FIG. 11 is a schematic structural diagram of a terminal device according to an embodiment of the present application. As shown in FIG. 11, the device includes the following modules.

A first sending module 21, is configured to send a first Bluetooth advertising message, where the first Bluetooth advertising message includes a first channel pointer.

A second sending module 22, is configured to send a second Bluetooth advertising message on a channel indicated by the first channel pointer, where the second Bluetooth advertising message includes a WIFI direct address of the terminal device.

A first receiving module 23, is configured to receive a first Bluetooth message sent from a second device, where the first Bluetooth message includes a WIFI direct address of the second device.

A direct connection module 24, is configured to perform a WIFI direct connection operation according to the WIFI direct address of the terminal device and the WIFI direct address of the second device.

In an alternative embodiment, the second Bluetooth advertising message further includes service configuration information of the terminal device;

In an alternative embodiment, the terminal device further includes the following modules.

A second receiving module, is configured to receive a second Bluetooth message sent from the second device, where the second Bluetooth message includes a Bluetooth MAC address of the second device.

A third sending module, is configured to send a third Bluetooth advertising message to the second device based on the Bluetooth MAC address, where the third Bluetooth advertising message includes a start time and a second channel pointer to enable the second device to establish a WIFI direct connection with the terminal device based on a channel indicated by the second channel pointer when the start time arrives.

In an alternative embodiment, the terminal device further includes:

a switch module, configured to turn off a Bluetooth device of the terminal device.

The terminal device according to the embodiment can perform the scheme in the embodiment in FIG. 8, in which the specific implementation method and beneficial effects are similar, which are not described herein again.

Figure 12:
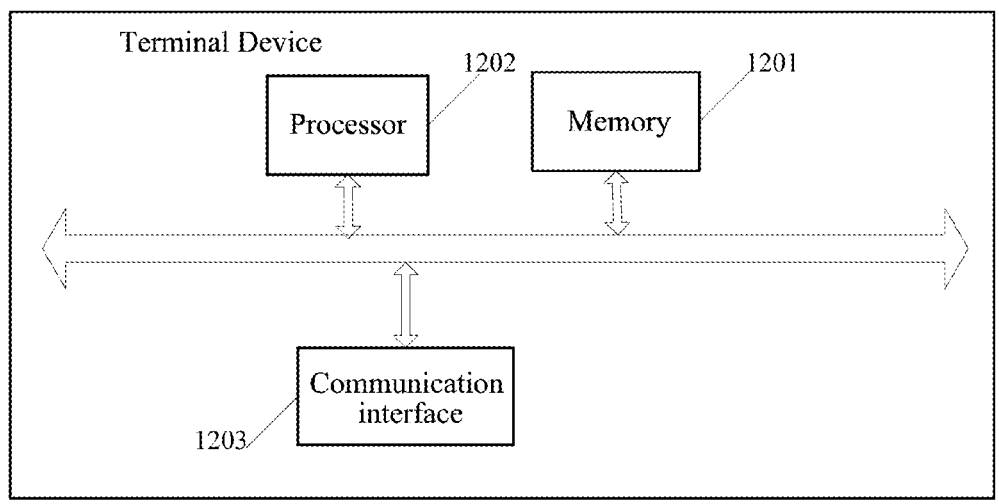
FIG. 12 is a schematic structural diagram of a terminal device according to an embodiment of the present application.

FIG. 12 is a schematic structural diagram of a terminal device according to an embodiment of the present application. As shown in FIG. 12, the terminal device in the embodiment may include: a memory 1201, a processor 1202, and a communication interface 1203; where the memory 1201 is configured to store programs. Specifically, the programs may include program codes including computer instructions. The memory 1201 may include a random access memory (RAM), and may also include a non-volatile memory, such as at least one disk memory.

The processor 1202 is configured to perform a program stored in the memory 1201 and is configured to perform the scheme in the method embodiments of the present application. The implementation principle and technical effects are similar, reference may be made to the method embodiment shown in FIG. 1 or FIG. 8, and details are not described herein again.

The above apparatus may be implemented in a terminal device, and the functions of the above various modules in the above apparatus may be implemented by the processor 1202.

The above components communicate via one or more buses. Those of skilled in the art can understand that the structure of the terminal device shown in FIG. 12 should not construe a limitation to the present application. It may be a bus structure or a star structure, and may include more or fewer components than those shown, or some components combined, or different component arrangements.

A non-transitory computer-readable storage medium, instructions in the storage medium, when performed by a processor of a terminal device, enable the terminal device to perform the following methods:

the terminal device receives a first Bluetooth advertising message from a first device, where the first Bluetooth advertising message includes a first channel pointer;

the terminal device receives a second Bluetooth advertising message from the first device on a channel indicated by the first channel pointer, where the second Bluetooth advertising message includes a WIFI direct address of the first device;

the terminal device sends a first Bluetooth message to the first device, where the first Bluetooth message includes a WIFI direct address of the terminal device; and the terminal device performs a WIFI direct connection operation according to the WIFI direct address of the first device and the WIFI direct address of the terminal device.

Finally, it should be noted that those of skilled in the art can understand that all or part of the processes in the preceding method embodiments can be completed by instructing related hardware through computer programs, and the programs can be stored in a computer-readable storage medium. When the programs are performed, it may include the processes of the embodiments of the preceding methods. The storage medium may be a magnetic disk, an optical disk, a read-only storage memory (ROM), or a random storage memory (RAM), and the like.

Each functional unit in the embodiments of the present application may be integrated into one processing module, or each of the units may exist separately physically, or two or more units may be integrated into one module. The above integrated modules may be implemented in the form of hardware or software functional module. The integrated module may also be stored in a computer-readable storage medium if it is implemented in the form of the software functional module and sold or used as an independent product. The above storage medium may be a read-only memory, a magnetic disk, or an optical disk.

The above embodiments are only used to describe the schemes of the present application, rather than limiting thereto. Although the present application has been described in detail with reference to the above embodiments, those of skilled in the art should understand that they can still modify the schemes described in the above embodiments, or perform equivalents on some or all of the technical features; and these modifications or replacements do not make the essence of the corresponding schemes depart from the scope of the embodiments of the present application.

What is claimed is:

1. A wireless connection method, comprising:
   receiving, by a second device, a first Bluetooth advertising message from a first device, wherein the first Bluetooth advertising message comprises a first channel pointer for indicating on which channel the second device receives a second Bluetooth advertising message;
   receiving, by the second device, the second Bluetooth advertising message from the first device on the channel indicated by the first channel pointer at a preset time interval after receiving the first Bluetooth advertising message to ensure that the second device has sufficient time to parse the first channel pointer from the first Bluetooth advertising message, and to make preparations for receiving the second Bluetooth advertising message on the channel indicated by the first channel pointer, wherein the second Bluetooth advertising message comprises a Wireless-Fidelity (WIFI) direct address of the first device;
   sending, by the second device, a first Bluetooth message to the first device, wherein the first Bluetooth message comprises a WIFI direct address of the second device; and
   performing, by the second device, a WIFI direct connection operation according to the WIFI direct address of the first device and the WIFI direct address of the second device.

2. The method according to claim 1, wherein the second Bluetooth advertising message further comprises service configuration information of the first device.

3. The method according to claim 2, wherein after the receiving, by the second device, a second Bluetooth advertising message from the first device on a channel indicated by the first channel pointer, the method further comprises:
   determining whether to establish a WIFI direct connection with the first device based on the service configuration information of the first device.

4. The method according to claim 3, wherein the method further comprises:
   in response to that it is determined to establish the WIFI direct connection with the first device, sending the first Bluetooth message to the first device.

5. The method according to claim 4, wherein the performing, by the second device, a WIFI direct connection operation according to the WIFI direct address of the first device and the WIFI direct address of the second device, comprises:
   sending, by the second device, a second Bluetooth message to the first device, wherein the second Bluetooth message comprises a Bluetooth Medium Access Control (MAC) address of the second device;
   receiving, by the second device, a third Bluetooth advertising message from the first device on a port where the Bluetooth MAC address indicates, wherein the third Bluetooth advertising message comprises a start time and a second channel pointer; and
   establishing, by the second device, a WIFI direct connection with the first device based on a channel indicated by the second channel pointer when the start time arrives.

6. The method according to claim 5, wherein after the receiving, by the second device, a third Bluetooth advertising message from the first device, the method further comprises:
turning off, by the second device, a Bluetooth device of the second device.

7. The method according to claim 1, wherein the performing, by the second device, a WIFI direct connection operation according to the WIFI direct address of the first device and the WIFI direct address of the second device, comprises:
sending, by the second device, a second Bluetooth message to the first device, wherein the second Bluetooth message comprises a Bluetooth Medium Access Control (MAC) address of the second device;
receiving, by the second device, a third Bluetooth advertising message from the first device on a port where the Bluetooth MAC address indicates, wherein the third Bluetooth advertising message comprises a start time and a second channel pointer; and
establishing, by the second device, a WIFI direct connection with the first device based on a channel indicated by the second channel pointer when the start time arrives.

8. The method according to claim 7, wherein after the receiving, by the second device, a third Bluetooth advertising message from the first device, the method further comprises:
turning off, by the second device, a Bluetooth device of the second device.

9. A terminal device, comprising: a memory and a processor, wherein the memory stores computer instructions,
wherein the processor is configured to execute the computer instructions to cause the terminal device to:
receive a first Bluetooth advertising message from a first device, wherein the first Bluetooth advertising message comprises a first channel pointer for indicating on which channel the second device receives a second Bluetooth advertising message;
receive the second Bluetooth advertising message from the first device on the channel indicated by the first channel pointer at a preset time interval after receiving the first Bluetooth advertising message to ensure that the second device has sufficient time to parse the first channel pointer from the first Bluetooth advertising message, and to make preparations for receiving the second Bluetooth advertising message on the channel indicated by the first channel pointer, wherein the second Bluetooth advertising message comprises a Wireless-Fidelity (WIFI) direct address of the first device;
send a first Bluetooth message to the first device, wherein the first Bluetooth message comprises a WIFI direct address of the terminal device; and
perform a WIFI direct connection operation according to the WIFI direct address of the first device and the WIFI direct address of the terminal device.

10. The terminal device according to claim 9, wherein the second Bluetooth advertising message further comprises service configuration information of the first device.

11. The terminal device according to claim 10, wherein the processor is further configured to execute the computer instructions to cause the terminal device to:
determine whether data transmitted between the terminal device and the first device is compatible based on the service configuration information of the first device after the second Bluetooth advertising message is received, and
in response to the data being compatible, determine to establish a WIFI direct connection between the terminal device and the first device.

12. The terminal device according to claim 11, wherein the processor is further configured to execute the computer instructions to cause the terminal device to:
send the first Bluetooth message to the first device in response to being determined to establish the WIFI direct connection between the terminal device and the first device.

13. The terminal device according to claim 12, wherein the processor is further configured to execute the computer instructions to cause the terminal device to:
send a second Bluetooth message to the first device, wherein the second Bluetooth message comprises a Bluetooth Medium Access Control (MAC) address of the terminal device;
receive a third Bluetooth advertising message from the first device on a port where the Bluetooth MAC address indicates, wherein the third Bluetooth advertising message comprises a start time and a second channel pointer; and
establish a WIFI direct connection between the first device and the terminal device based on a channel indicated by the second channel pointer when the start time arrives.

14. The terminal device according to claim 13, wherein the processor is further configured to execute the computer instructions to cause the terminal device to:
turn off a Bluetooth device of the terminal device.

15. The terminal device according to claim 9, wherein the processor is further configured to execute the computer instructions to cause the terminal device to:
send a second Bluetooth message to the first device, wherein the second Bluetooth message comprises a Bluetooth Medium Access Control (MAC) address of the terminal device;
receive a third Bluetooth advertising message from the first device on a port where the Bluetooth MAC address indicates, wherein the third Bluetooth advertising message comprises a start time and a second channel pointer; and
establish a WIFI direct connection between the first device and the terminal device based on a channel indicated by the second channel pointer when the start time arrives.

16. The terminal device according to claim 15, wherein the processor is further configured to execute the computer instructions to cause the terminal device to:
turn off a Bluetooth device of the terminal device.

17. The terminal device according to claim 9, wherein the first Bluetooth advertising message is in the form of an ADV_EXT_IND frame.

18. The terminal device according to claim 17, wherein the first channel pointer is set before RFU field.

19. The terminal device according to claim 17, wherein the first channel pointer is set after RFU field.

20. The terminal device according to claim 9, wherein the first Bluetooth advertising message and the second Bluetooth advertising message are transmitted alternatively.

* * * * *